(12) United States Patent
Hochstetler et al.

(10) Patent No.: US 10,763,722 B2
(45) Date of Patent: Sep. 1, 2020

(54) TERMINAL BLOCK FOR USE IN INTEGRATED DRIVE GENERATOR

(71) Applicant: HAMILTON SUNDSTRAND CORPORATION, Charlotte, NC (US)

(72) Inventors: Derek R. Hochstetler, Rockford, IL (US); Ted A. Martin, Byron, IL (US); Duane C. Johnson, Beloit, WI (US); Glenn C. Lemmers, Jr., Loves Park, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 107 days.

(21) Appl. No.: 15/868,217

(22) Filed: Jan. 11, 2018

(65) Prior Publication Data

US 2019/0214881 A1 Jul. 11, 2019

(51) Int. Cl.
| | |
|---|---|
| *H02K 5/22* | (2006.01) |
| *H01R 9/24* | (2006.01) |
| *H02K 7/10* | (2006.01) |
| *H02K 7/18* | (2006.01) |
| *H01R 9/16* | (2006.01) |
| *F02C 7/32* | (2006.01) |
| *B64D 41/00* | (2006.01) |
| *H02K 7/116* | (2006.01) |
| *H01R 105/00* | (2006.01) |

(52) U.S. Cl.
CPC ............... *H02K 5/225* (2013.01); *F02C 7/32* (2013.01); *H01R 9/16* (2013.01); *H01R 9/24* (2013.01); *H01R 9/2416* (2013.01); *H02K 7/116* (2013.01); *H02K 7/1823* (2013.01); *B64D 41/00* (2013.01); *F05D 2220/76* (2013.01); *H01R 2105/00* (2013.01); *H01R 2201/26* (2013.01)

(58) Field of Classification Search
CPC ...... H02K 5/225; H02K 7/116; H02K 7/1823; F02C 7/32; B64D 41/00; F05D 2220/76; H01R 9/16; H01R 9/24; H01R 9/2416; H01R 2105/00; H01R 2201/26
USPC .......................................................... 310/71
See application file for complete search history.

(56) References Cited

U.S. PATENT DOCUMENTS 3,576,143 A * 4/1971 Baits ....................... F16H 47/04
475/77
2003/0203673 A1 10/2003 Doherty et al.
(Continued)

FOREIGN PATENT DOCUMENTS

| EP | 2636872 | 9/2013 |
|---|---|---|
| EP | 3032075 | 6/2016 |

OTHER PUBLICATIONS

The Extended European Search Report for EP Application No. 19151460.3, dated May 28, 2019.

*Primary Examiner* — Tulsidas C Patel
*Assistant Examiner* — Robert E Mates
(74) *Attorney, Agent, or Firm* — Carlson, Gaskey & Olds, P.C.

(57) ABSTRACT

A terminal block for use in an integrated drive generator has a body having an outer support surface and extending to an inner surface. There are four connection channels for supporting electric connections for each of three phases of power and a neutral. There are fingers formed between adjacent ones of each of the four connection channels, with the fingers extending away from the support surface in a direction away from the inner surface. An integrated drive generator and a method are also disclosed.

3 Claims, 5 Drawing Sheets

(56) References Cited

U.S. PATENT DOCUMENTS

| | | | |
|---|---|---|---|
| 2008/0218297 A1* | 9/2008 | Kim | H01H 71/02 |
| | | | 335/202 |
| 2012/0190250 A1 | 7/2012 | Patel et al. | |
| 2013/0036602 A1* | 2/2013 | Patel | H02K 5/225 |
| | | | 29/596 |
| 2014/0199894 A1* | 7/2014 | Kusamaki | H01R 4/34 |
| | | | 439/709 |
| 2014/0305692 A1* | 10/2014 | Hochstetler | H05K 1/11 |
| | | | 174/551 |
| 2014/0306560 A1* | 10/2014 | Hochstetler | H02K 5/225 |
| | | | 310/71 |

* cited by examiner

TERMINAL BLOCK FOR USE IN INTEGRATED DRIVE GENERATOR

BACKGROUND

This application relates to a terminal block for the power output terminal of an integrated drive generator.

Integrated drive generators are known and often utilized in aircraft. As known, a gas turbine engine on the aircraft provides a drive input into a generator input shaft. The generator typically includes a disconnect shaft that can transmit the input into a gear differential. The gear differential selectively drives a main generator to provide electric power for various uses on the aircraft.

It is desirable that the generated power be of a desired constant frequency. However, the speed from the input shaft will vary during operation of the gas turbine engine. This would result in variable frequency.

Integrated drive generators are provided with speed trimming hydraulic units. Gears associated with the differential and, in particular, a ring gear portion, provide rotation from the differential back into the trimming unit. A carrier also rotates another portion of the trimming unit. The trimming unit is operable to result in the output speed of the differential being effectively constant, such that electric power of a desirable frequency is generated.

The generator is mounted between two housing portions and a seal plate is mounted between the two housing portions.

In addition, various accessory systems, such as various pumps, are driven by the carrier of the differential through an accessory drive gear.

There is a terminal block for the power leaving the integrated drive generator. The terminal block faces design challenges.

SUMMARY

A terminal block for use in an integrated drive generator has a body having an outer support face and extending to an inner face. There are four connection channels for supporting electric connections for each of three phases of power and a neutral. There are fingers formed between adjacent ones of each of the four connection channels, with the fingers extending away from the support face in a direction away from the inner face.

An integrated drive generator and a method are also disclosed.

These and other features may be best understood from the following drawings and specification.

DETAILED DESCRIPTION

Figure 1A:
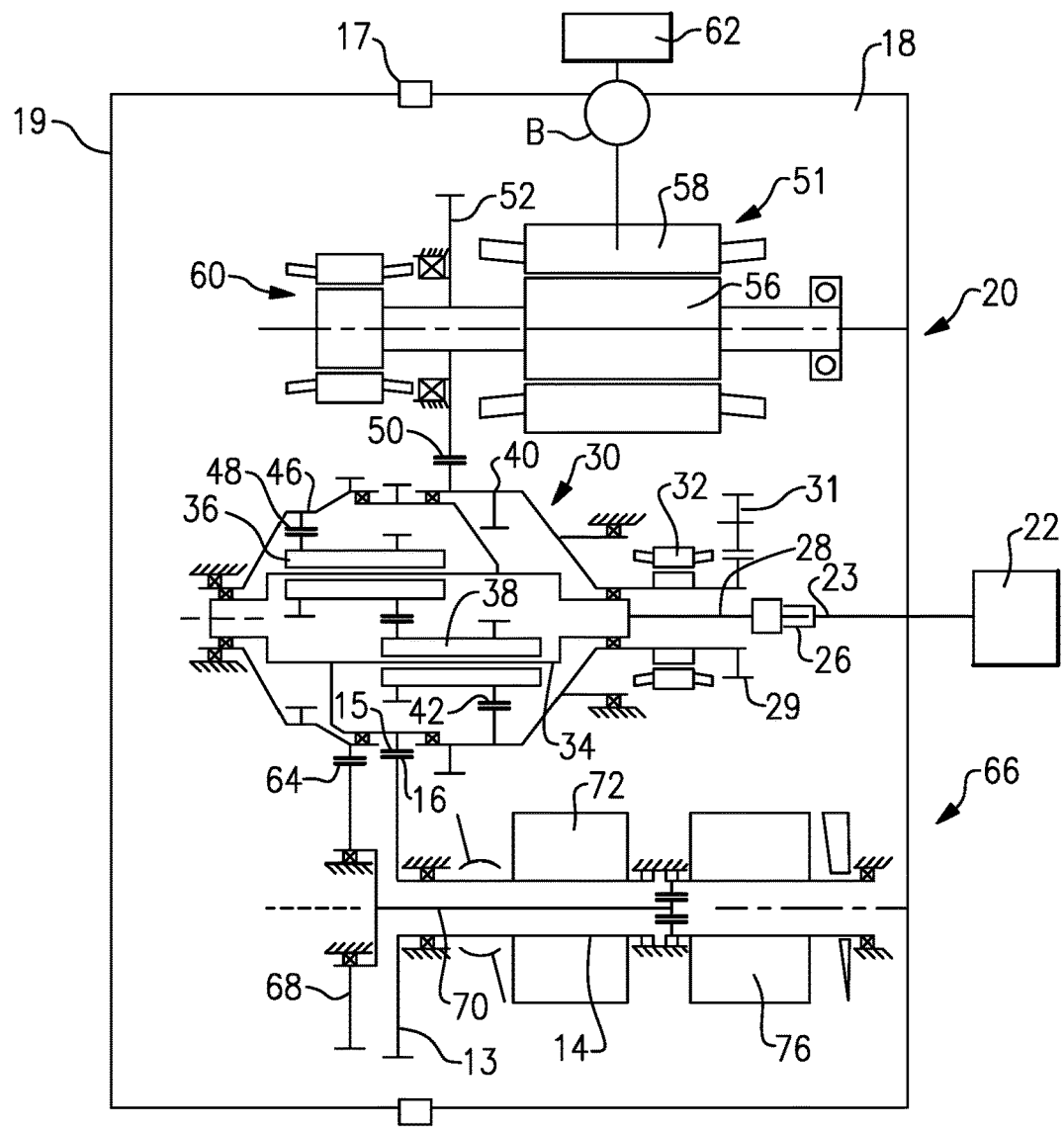
FIG. 1A schematically shows an integrated drive generator.

FIG. 1A shows an integrated drive generator 20. As shown, housing portions 18 and 19 surround the integrated drive generator and a seal plate 17 sits between the housing portions 18 and 19.

A gas turbine engine 22 may drive an input shaft 23 which selectively drives a disconnect assembly 26. The disconnect assembly 26, in turn, drives a carrier shaft 28, which drives a carrier in a gear differential 30.

As the carrier shaft 28 rotates, planet gears 36 and 38 are caused to rotate. Gears 38 have a gear interface 42 with a first ring gear portion 40. Gears 36 have a gear interface 48 with a second ring gear portion 46.

Ring gear portion 40 has a gear interface 50 with a main generator 51 having a drive gear 52. When drive gear 52 is driven to rotate, it rotates a rotor 56 associated with a stator 58 of the main generator as well as an exciter rotor 60. Electric power is generated for a use 62, as known.

It is desirable that the frequency of the generated electric power be at a desired frequency. This requires the input speed to gear 52 to be relatively constant and at the desired speed. As such, the speed of the input shaft 23 is added to the speed of the speed trimmer 66 to result in a constant input speed to gear 52.

A gear 15 that is part of the carrier has a gear interface 16 with a gear 13 driving a shaft 14 also within the speed trimmer.

As known, the speed trimmer 66 includes a variable unit 72 and a fixed unit 76. The units 72 and 76 may each be provided with a plurality of pistons and a swash plate arrangement. If the input speed of the gear 13 is too high, the speed of the gear 52 will also be too high, and hence, the speed trimmer 66 acts to lower the speed of the trim gear 46 which will drop the speed of gear 52. On the other hand, if the input speed is too low, the speed trimmer will increase the trim gear speed and he speed seen by gear 52 will increase.

In essence, the variable unit 72 receives an input through gear 13 that is proportional to the speed of the input shaft 23. The variable unit 72 also receives a control input from a control monitoring the speed of the generator rotor 56. The position of the swash plate in the variable unit 72 is changed to in turn change the speed and direction of the fixed unit 76. The fixed unit 76 can change the speed, and direction of rotation of the shaft 70, and this then provides control back through the trim ring gear 46 to change the speed reaching the generator. In this manner, the speed trimmer 66 results in the frequency generated by the generator being closer to constant, and at the desired frequency.

A permanent magnet generator 32 rotates with the ring gear 40.

An accessory drive shaft 29 rotates with the ring gear 40 and drives a plurality of accessory gears 31.

The operation of the integrated drive generator 20 is generally as known in the art. A worker of ordinary skill would recognize that the desired frequency and speed at use 62 would dictate a number of design functions.

As can be appreciated, the power leaving the integrated drive generator 20 to the uses 62 must pass through a terminal at the area schematically shown at B.

Figure 1B:
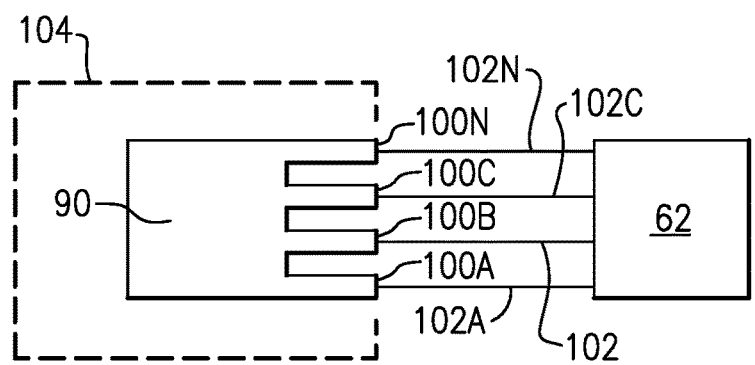
FIG. 1B shows a detail of the area B from FIG. 1A.

FIG. 1B schematically shows detail of the area B. As shown, an output terminal 90 has a plurality of discrete connections shown schematically here. Three phases of power are supplied from electrical connections 100A, 100B, and 100C. A neutral 100N is also included. A plurality of wires 102N, A, B and C connect to the uses 62. Thus, power is supplied to uses 62. A terminal block cover 104 is identified by a body 105 (FIGS. 2A-2E) and covers the connections 100A, 100B, 100C and 100N.

Figure 2A:
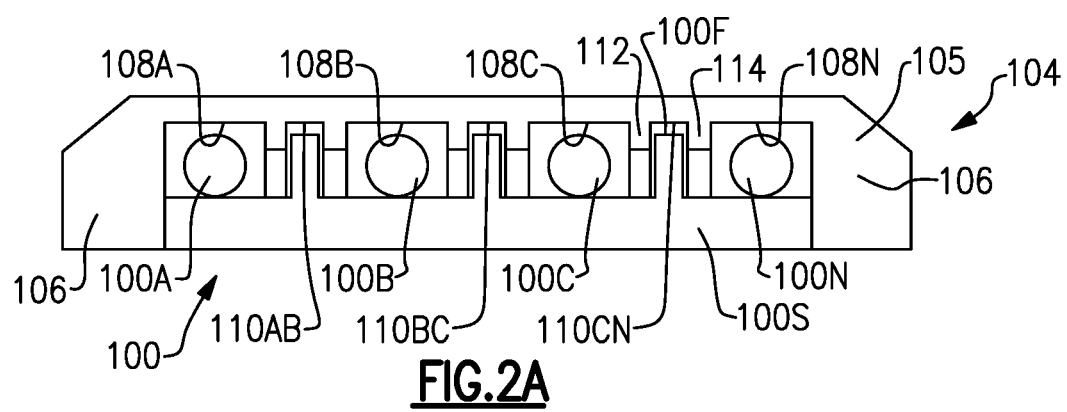
FIG. 2A shows a first detail of the FIG. 1B connection.

FIG. 2A shows the terminal block cover 104 having opposed thick ends 106 and intermediate connection channels 108A, 108B, 108C, and 108N for receiving the connections 100A, 100B, 100C, and 100N, respectively. Intermediate spacing channels 110AB, 110BC, and 110CN separate each of the connections to provide increased creep and lightning protection.

A support, or terminal block 100, supports the connections 100A, B, C and N. Terminal block 100 has a support surface 100S with fingers 100F that extend into the spacing channels 110AB, 110BC, and 110CN.

Figure 2B:
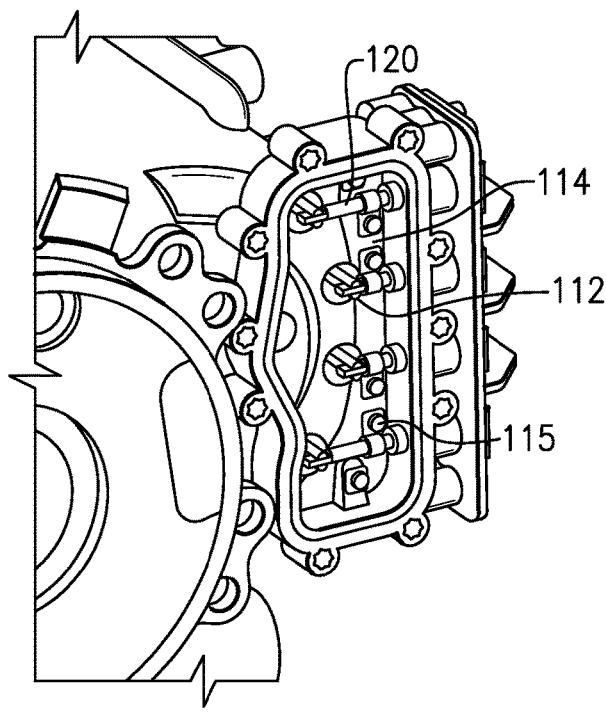
FIG. 2B shows further details.
Figure 2C:
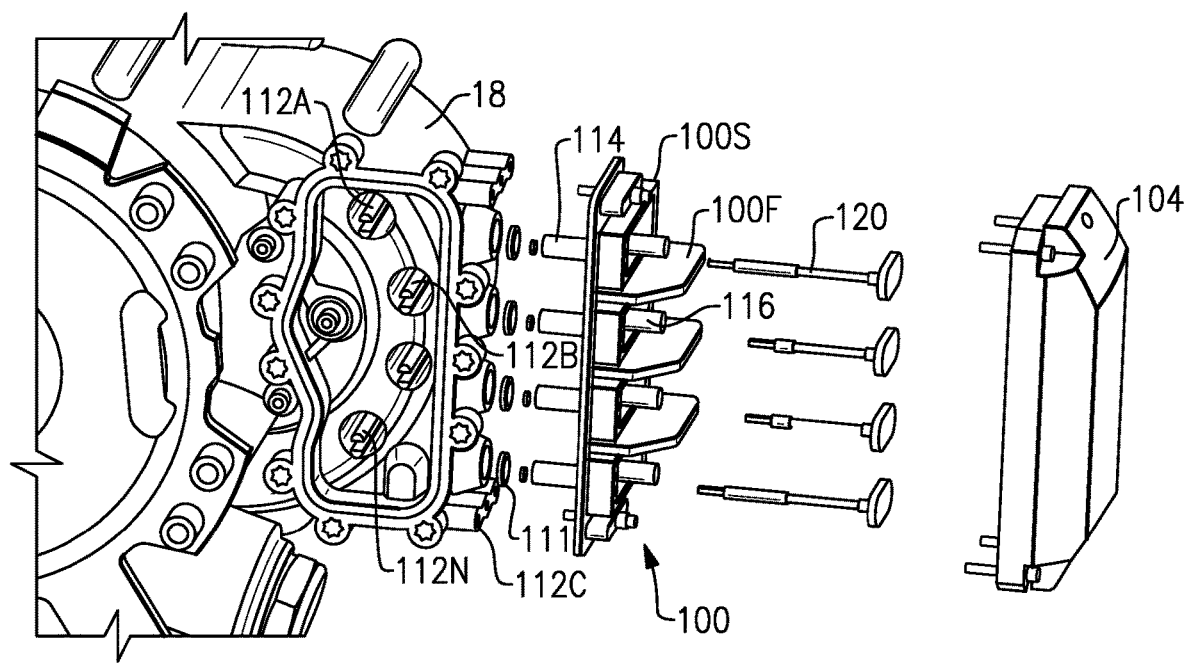
FIG. 2C shows further details.

FIG. 2C is an assembly view showing the housing 18 and an exploded view showing the terminal block 100 and the terminal block cover 104 removed. Terminal lead assemblies 120 extend through holes in the terminal block, as will be explained below, and through holes 111 in the housing 18 to communicate with electrical connections 112A, 112B, 112C, and 112N, which extend from the generator.

FIG. 2B is an assembly view showing an inner end of the terminal lead assemblies 120 connected into the leads 112. A terminal support bracket 114 is also shown which includes clamps 115 to secure intermediate portions of the terminal lead assembly 120 to the housing 18.

Figure 3A:
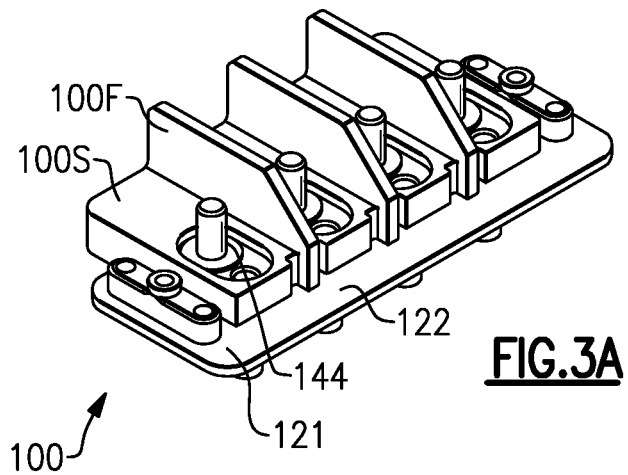
FIG. 3A shows a terminal block.

FIG. 3A shows details of the terminal block 100 defined by a body 121. Phase lead connections 144 extend from the support surface 100S. There are four of the phase lead connections 144, which will each be associated with one of the connectors 100A, 100B, 100C, 100N. There are three fingers 100F. Further, a surface 122 is associated with a closed end of the cover 104. An open end of the cover 104 is on an opposed side of the terminal block 100 and it is through this open end where the electrical connections to phase lead wires 102 will be made. The fingers 100F separate connection channels.

Figure 3B:
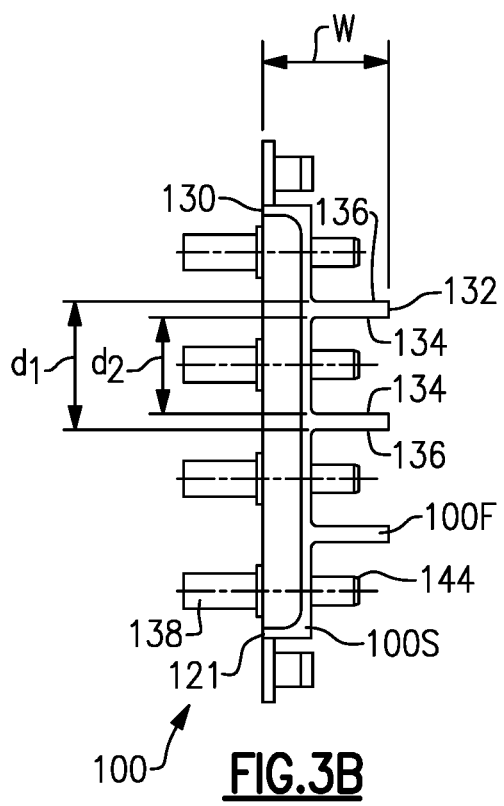
FIG. 3B shows a side view of the terminal block.

FIG. 3B shows further details of the terminal block 100. A width W is defined between an inner surface 130 of the terminal block and to a spaced tip 132 of the fingers 100F, which is the location on the fingers 100F spaced from surface 130 by the greatest distance. A distance d1 is defined between outer faces 136 of the fingers facing away from inner faces 134 defining a channel. The inner faces 134 are spaced by a distance d2. It should be understood that laterally outer fingers 100F also face inner surfaces of the cover 104.

Inner guide structures 138 extend away from surface 130 and in a direction away from tip 132.

Figure 3C:
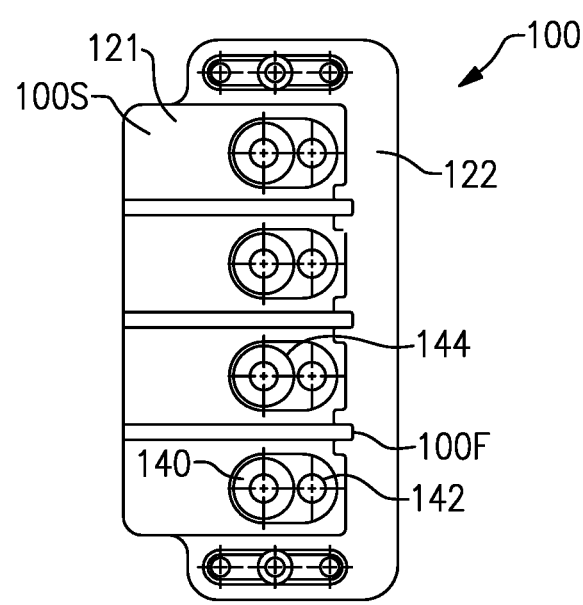
FIG. 3C shows a top view of the terminal block.

FIG. 3C shows further details with a recess 140 formed in surface 100S and receiving the phase lead connection 144 and a hole 142. The terminal lead assemblies 120 extend through the holes 142 to connect into the leads 112.

In embodiments, W was 1.684 inches (4.277 centimeters). It should be understood that this in all dimensions in the application have a tolerance of +/−0.010 inch (0.025 centimeters) and the claims should be interpreted as such. The distance d1 in one embodiment was 1.700 inches (4.318 centimeters) and the distance d2 was 1.300 inches (3.302 centimeters).

In embodiments, a ratio of W to d2 is between 1.20 and 1.40. A ratio of W to d1 is between 0.90 and 1.10, and a ratio of d1 to d2 is between 1.25 and 1.35.

Figure 3D:
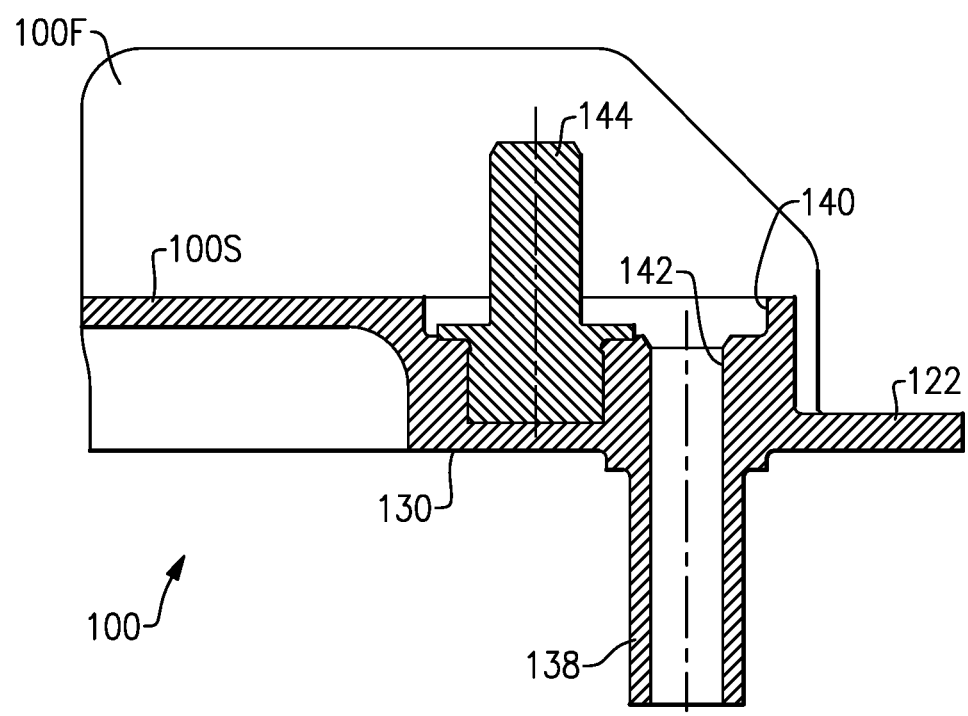
FIG. 3D is a cross-sectional view through a portion of the terminal block.

FIG. 3D is a cross-section through one of the recesses 140. As shown, the support surface 100S is spaced from the inner surface 130 and the recess 140 extends towards surface 130 away from surface 100S. The phase lead connection 144 is shown as is the aperture 142, as well as the surface 122, that will receive the closed end of the terminal block cover.

A method of replacing a terminal block includes the steps of removing an existing terminal block from an integrated drive generator including an input shaft connected to a carrier shaft. The carrier shaft is connected into a gear differential and into a main generator. The main generator is configured to provide three phases of electrical power to three electrical connections at a terminal connection, and the existing terminal block supporting said three electrical connections and a neutral connection. The existing terminal block supports is then replaced with a replacement terminal block cover, including a body having a support surface and an inner surface. There are four connection channels for receiving electric connections for each of three phases of power and a neutral. Three fingers extend from the support surface to separate the four connection channels.

Although an embodiment of this invention has been disclosed, a worker of ordinary skill in this art would recognize that certain modifications would come within the scope of this disclosure. For that reason, the following claims should be studied to determine the true scope and content of this disclosure.

The invention claimed is:

1. A terminal block for use in an integrated drive generator comprising:
   a body having an outer support surface and extending to an inner surface, and there being four connection channels for supporting electric connections for each of three phases of power and a neutral, and there being fingers formed between adjacent ones of each of said four connection channels, with said fingers extending away from said support surface in a direction away from said inner surface;
   outer sides of said fingers are spaced by a first distance and there being a second distance between interior facing sides of said fingers and a ratio of said first distance to said second distance being between 1.20 and 1.40;
   a width of said terminal block is defined between said inner surface and an end of said fingers spaced furthest from said inner surface and a ratio of said width to said second distance being between 0.90 and 1.10;
   a ratio of said width to said first distance being between 1.20 and 1.40; and
   wherein there being recesses extending into said support surface of said terminal block and including an aperture through which lead assemblies may extend and a support structure extending in a direction away from said inner surface and beyond said support surface.

2. An integrated drive generator comprising:
   an input shaft connected to a carrier shaft, said carrier shaft connected to a gear differential, and into a main generator, said main generator including a power output configured for providing three phases of electrical power to an outlet, and there being a terminal block supporting electrical connections for three phases of electrical power and an electrical connection for a neutral;
   said terminal block having a body with an outer support surface and extending to an inner surface there being four connection channels for supporting said electric connections for each of three phases of power and neutral, and there being fingers formed between adjacent ones of each of said four connection channels, with said fingers extending away from said support surface in a direction away from said inner surface;

outer sides of said fingers are spaced by a first distance and there being a second distance between interior facing sides of said fingers and a ratio of said first distance to said second distance being between 1.25 and 1.35;

a width of said terminal block is defined between said inner surface and an end of said fingers spaced furthest from said inner surface and a ratio of said width to said second distance being between 0.90 and 1.10;

a ratio of said width to said first distance being between 1.20 and 1.40; and wherein there being recesses extending into said support surface of said terminal block and including an aperture through which lead assemblies may extend and a support structure extending in a direction away from said inner surface and beyond said support surface.

3. A method of replacing a terminal block comprising the steps of:

a) removing an existing terminal block from an integrated drive generator including an input shaft connected to a carrier shaft, said carrier shaft connected to a gear differential, and into a main generator, said main generator configured for providing three phases of electrical power to three electrical connections at a terminal connection, and said existing terminal block supporting said three electrical connections and a neutral connection;

b) replacing said existing terminal block with a replacement terminal block having a body with an outer support surface and extending to an inner surface there being four connection channels for supporting electric connections for each of three phases of power and neutral, and there being fingers formed between adjacent ones of each of said four connection channels, with said fingers extending away from said support surface in a direction away from said inner surface;

outer sides of said fingers are spaced by a first distance and there being a second distance between interior facing sides of said fingers and a ratio of said first distance to said second distance being between 1.25 and 1.35;

a width of said replacement terminal block is defined between said inner surface and an end of said fingers spaced furthest from said inner surface and a ratio of said width to said second distance being between 0.90 and 1.10;

a ratio of said width to said first distance being between 1.20 and 1.40; and wherein there being recesses extending into said support surface of said replacement terminal block and including an aperture through which lead assemblies may extend and a support structure extending in a direction away from said inner surface and beyond said support surface.

* * * * *